(12) United States Patent
Knox et al.

(10) Patent No.: US 6,788,460 B2
(45) Date of Patent: Sep. 7, 2004

(54) PROJECTION SCREEN APPARATUS

(75) Inventors: Richard M. Knox, Houston, TX (US);
Dale S. Walker, Houston, TX (US)

(73) Assignee: Duke University, Durham, NC (US)

( * ) Notice: Subject to any disclaimer, the term of this patent is extended or adjusted under 35 U.S.C. 154(b) by 0 days.

(21) Appl. No.: 10/120,785

(22) Filed: Apr. 12, 2002

(65) Prior Publication Data

US 2003/0038999 A1 Feb. 27, 2003

Related U.S. Application Data

(63) Continuation-in-part of application No. 09/521,236, filed on Apr. 5, 2000, now Pat. No. 6,483,612, which is a continuation of application No. 09/060,906, filed on Apr. 15, 1998, now abandoned.

(51) Int. Cl.[7] .............................................. G03B 21/60
(52) U.S. Cl. ...................................... 359/456; 359/457
(58) Field of Search ................................ 359/455, 456, 359/457, 619

(56) References Cited

U.S. PATENT DOCUMENTS

| | | | | |
|---|---|---|---|---|
| 4,083,626 A | * | 4/1978 | Miyahara et al. | 359/457 |
| 4,172,219 A | * | 10/1979 | Deml et al. | 359/456 |
| 4,268,118 A | * | 5/1981 | Palmquist et al. | 359/455 |
| 4,418,986 A | * | 12/1983 | Yata et al. | 359/456 |
| 4,490,010 A | * | 12/1984 | Honda et al. | 359/456 |
| 4,523,849 A | | 6/1985 | Stone | 356/369 |
| 4,666,248 A | * | 5/1987 | van de Ven | 359/457 |
| 4,773,731 A | | 9/1988 | Goldenberg et al. | 359/457 |
| 4,799,137 A | | 1/1989 | Aho | 362/309 |
| 4,874,228 A | | 10/1989 | Aho et al. | 350/345 |
| 4,961,642 A | | 10/1990 | Ogino | 353/38 |
| 4,969,732 A | | 11/1990 | Wright et al. | 353/77 |
| 5,054,885 A | | 10/1991 | Melby | 359/618 |
| 5,122,905 A | | 6/1992 | Wheatley et al. | 359/586 |
| 5,122,906 A | | 6/1992 | Wheatley | 359/586 |
| 5,190,370 A | | 3/1993 | Miller et al. | 362/340 |
| 5,193,015 A | | 3/1993 | Shanks | 359/53 |
| 5,223,869 A | | 6/1993 | Yanagi | 353/78 |
| 5,333,072 A | | 7/1994 | Willett | 359/41 |
| 5,337,106 A | | 8/1994 | Jutamulia et al. | 354/152 |
| 5,337,179 A | * | 8/1994 | Hodges | 359/461 |
| 5,381,309 A | | 1/1995 | Borchardt | 362/31 |
| 5,404,076 A | | 4/1995 | Dolan et al. | 313/572 |
| 5,442,482 A | | 8/1995 | Johnson et al. | 359/619 |

(List continued on next page.)

FOREIGN PATENT DOCUMENTS

| | | |
|---|---|---|
| AT | 97/03956.4 | 11/1997 |
| EP | 9630 9443 | 4/1997 |
| JP | 3-243932 | 2/1990 |
| JP | 10-39769 A | 2/1998 |

(List continued on next page.)

OTHER PUBLICATIONS

Popovic et al. "Technique for Monolithic Fabrication of Microlens Arrays" Applied Optics, vol. 27, No. 7, pp 1281–1284 (Apr. 1988).*

Joubert, C. et al., "Dispersive Holographic Microlens Matrix For Single LCD Protection", SPIE vol. 2650, p. 243–252 (Mar. 1996).

(List continued on next page.)

Primary Examiner—Christopher Mahoney
(74) Attorney, Agent, or Firm—Myers Bigel Sibley & Sajovec

(57) ABSTRACT

Screen apparatuses are provided which include a first lens or holographic optical element layer and a second mask layer. The first layer substantially collimates image light rays to impinge on the mask layer. The mask layer provides an array or matrix of projecting members. Each of the projecting members receives and focuses the substantially collimated light rays to corresponding focal points. The mask layer includes a mask that blocks light transmission except where openings are located. The openings allow the light focused through the focal joints to substantially pass through the mask to form an image. The screen apparatuses can be advantageously employed in display apparatuses.

67 Claims, 4 Drawing Sheets

U.S. PATENT DOCUMENTS

| | | | |
|---|---|---|---|
| 5,453,859 A | 9/1995 | Sannohe et al. | 359/63 |
| 5,467,154 A | 11/1995 | Gale et al. | 353/119 |
| 5,486,949 A | 1/1996 | Schrenk et al. | 359/498 |
| 5,496,668 A | 3/1996 | Guckel et al. | |
| 5,504,391 A | 4/1996 | Turner et al. | 313/570 |
| 5,557,343 A | 9/1996 | Yamagishi | 348/781 |
| 5,563,738 A | 10/1996 | Vance | 359/614 |
| 5,573,324 A | 11/1996 | DeVann | 353/77 |
| 5,606,220 A | 2/1997 | Dolan et al. | 313/637 |
| 5,612,820 A | 3/1997 | Schrenk et al. | 359/498 |
| 5,615,045 A | 3/1997 | Takuma et al. | 359/456 |
| 5,626,800 A | 5/1997 | Williams et al. | 264/1.38 |
| 5,642,226 A * | 6/1997 | Rosenthal | 359/455 |
| 5,644,431 A | 7/1997 | Magee | 359/619 |
| 5,661,531 A | 8/1997 | Greene et al. | 349/73 |
| 5,670,842 A | 9/1997 | Dolan et al. | 313/570 |
| 5,682,080 A | 10/1997 | Dolan et al. | 313/570 |
| 5,686,793 A | 11/1997 | Turner et al. | 313/570 |
| 5,688,064 A | 11/1997 | Shanks | 403/24 |
| 5,692,820 A | 12/1997 | Gale et al. | 359/455 |
| 5,695,895 A | 12/1997 | Johnson et al. | 430/5 |
| 5,796,499 A | 8/1998 | Wenyon | 359/15 |
| 5,870,224 A * | 2/1999 | Saitoh et al. | 359/456 |
| 5,877,874 A | 3/1999 | Rosenberg | 359/15 |
| 5,877,893 A | 3/1999 | Kim | 359/456 |
| 5,932,342 A | 8/1999 | Zeira et al. | 428/327 |
| 5,933,276 A * | 8/1999 | Magee | 359/455 |
| 6,278,546 B1 | 8/2001 | Dubin et al. | 359/456 |
| 6,301,051 B1 * | 10/2001 | Sankur | 359/626 |
| 6,335,828 B1 | 1/2002 | Hashimoto et al. | |
| 6,410,213 B1 | 6/2002 | Raguin et al. | |
| 6,594,079 B1 * | 7/2003 | Trott et al. | 359/456 |
| 2002/0034014 A1 | 3/2002 | Gretton et al. | |
| 2002/0034710 A1 | 3/2002 | Morris et al. | |
| 2002/0145797 A1 | 10/2002 | Sales | |

FOREIGN PATENT DOCUMENTS

| | | |
|---|---|---|
| JP | 10-123623 A | 5/1998 |
| JP | 10-239503 A | 9/1998 |
| JP | 11-101902 A | 4/1999 |
| WO | 0488 590 A1 | 11/1991 |
| WO | 0 657 769 A1 | 12/1994 |
| WO | 94/29768 | 12/1994 |
| WO | WO 95/34832 | 12/1995 |
| WO | WO 9727606 | 7/1997 |

OTHER PUBLICATIONS

Parfenov, A.V. and Putilin, Andrey, "Advanced Optical Schemes With Liquid Crystal Image Converters For Display Applications" SPIE vol. 2650, pp. 173–179 (Jul. 1996).

Gambogi, W.J., et al., "Color Holography Using DuPont Holographic Recording Films", SPIE, vol. 2405 pp. 62–73 (Jan. 95).

Armstrng, D. Tipon and Stevenson, S., "Improved Process of Reflection Holography Replication and Heat Processing," SPIE vol. 2176 Practical Holography VIII, pp. 172–183 (1994).

Gambogi, W. et al., "HOE Imaging in Dupont Holographic Photopolymers", SPIE vol. 2152, pp. 282–293. (Jun. 1994).

Gambogi, W., et al., "Advances and Applications of DuPont Holographic Photopolymers", SPIE vol. 2043, pp. 2–13 (1993).

Gambogi, W., et al. "Diffractive Printing Methods Using Volume Holograms", IS&T/SPIE 1993, Intl. Conf. on Electronic Imaging Conf.

Gambogi, W.,et al. "Holographic Transmission Elements Using Improved Photopolymer Films", SPIE vol. 1555 Computer and Optically Holographic Optics (Fourth in a Series), pp 256–266 (1991).

Weber, Andrew M., et al. "Hologram Recording in DuPont's New Photopolymer Materials" Practical Holography IV, SPIE OE/Lase Conference Proceedings, (1990).

Weber, Andrew M. et al., "Hologram Recording in DuPont's New Photopolymer Materials", SPIE vol. 1212 Practical Holography IV, pp 30–39 (1990).

Love et al., *Microscope Projection Photolithography for Rapid Prototyping of Masters With Micron–Scale Features for Use in Soft Lithography*, Langmuir, vol. 17, 2001, pp. 6005–6012.

* cited by examiner

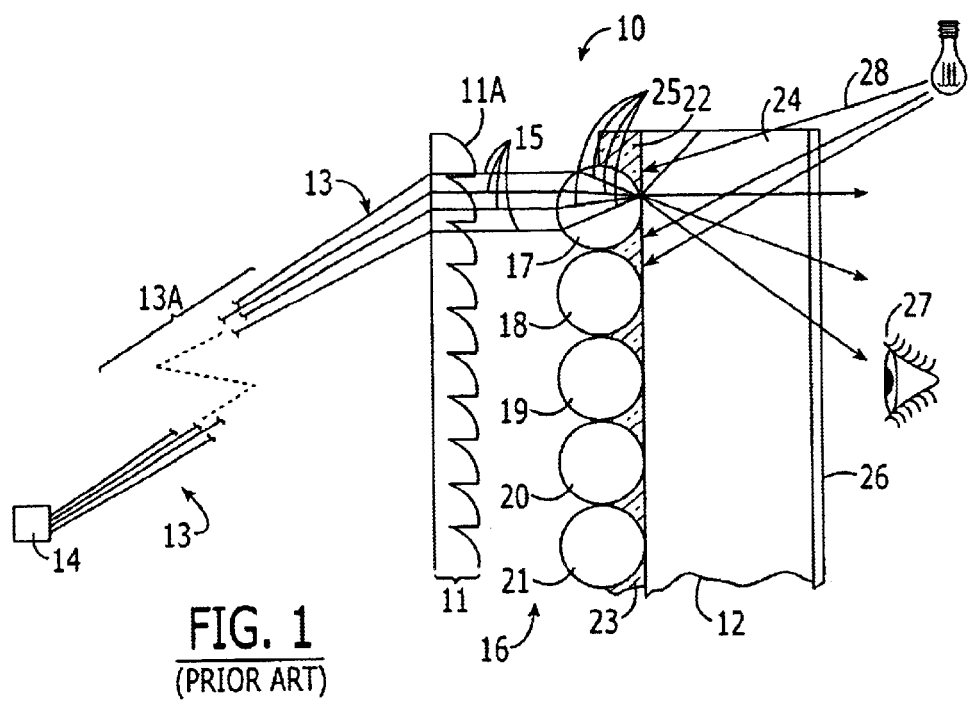
FIG. 1
(PRIOR ART)
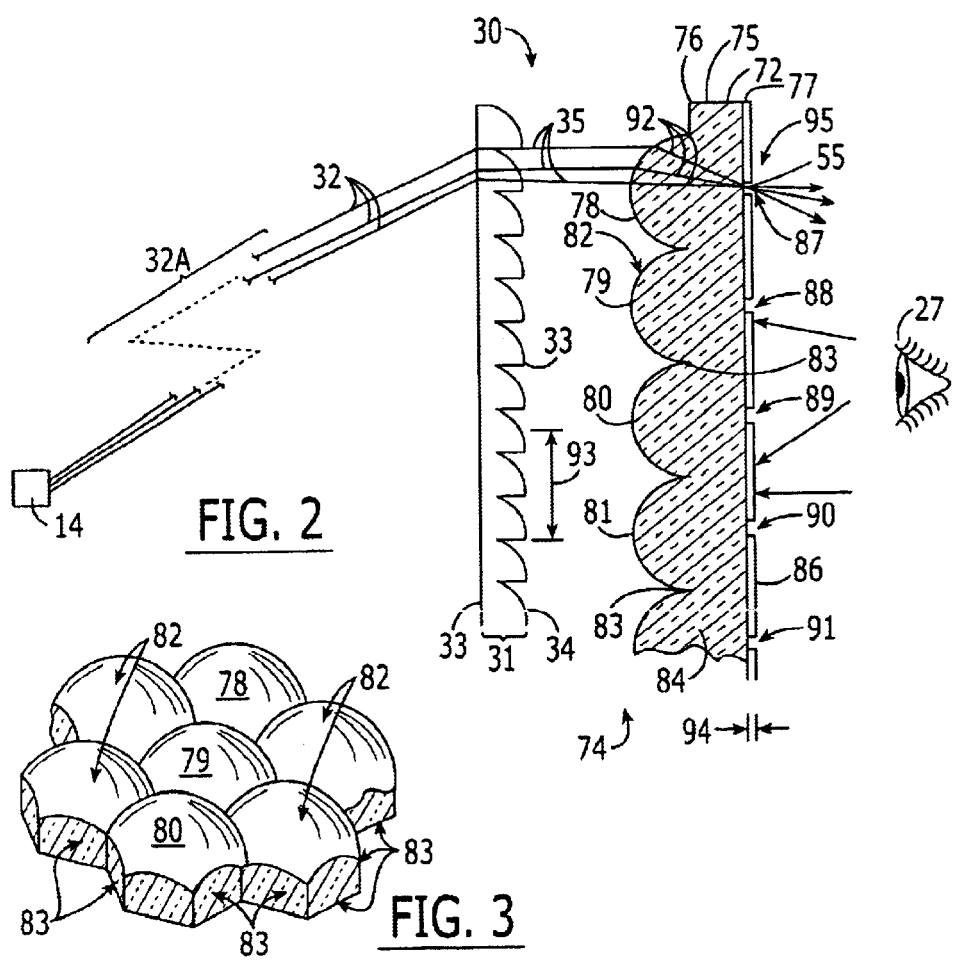
FIG. 2
FIG. 3

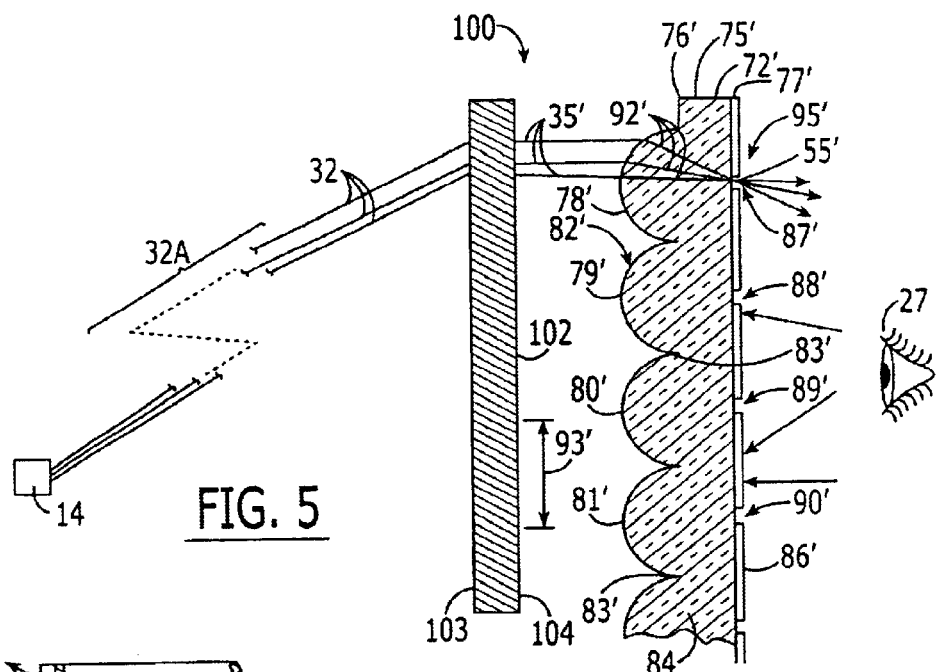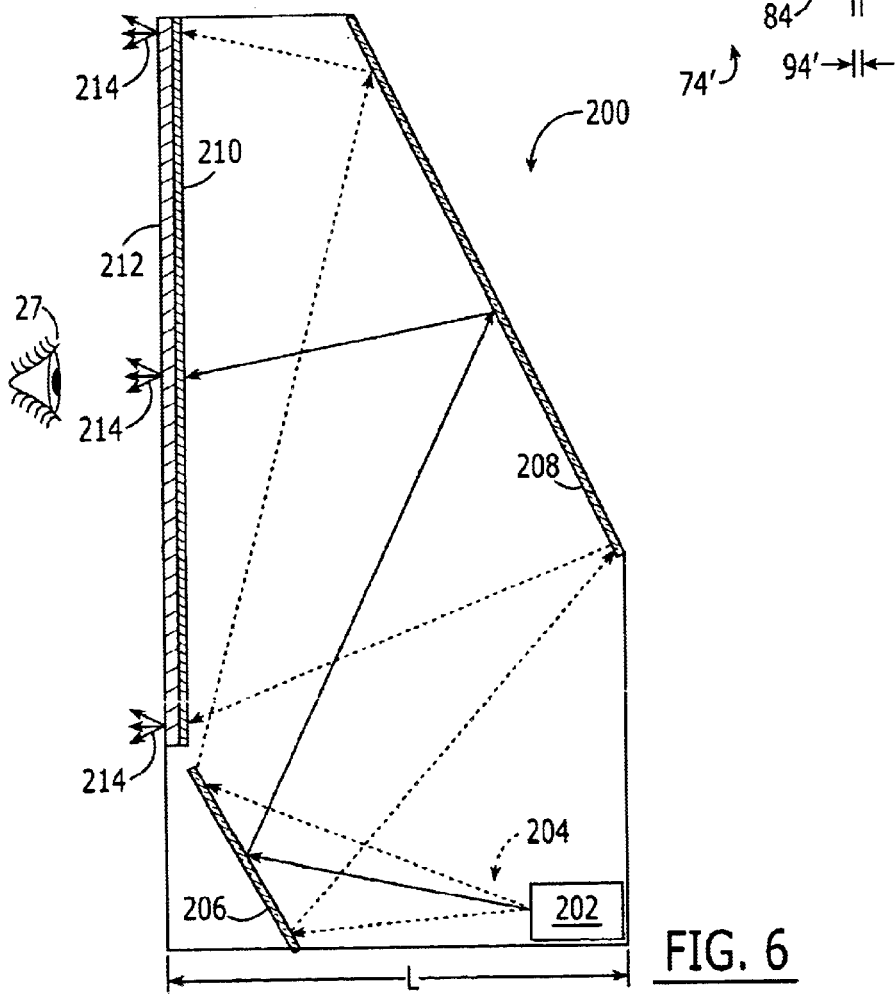

PROJECTION SCREEN APPARATUS

This application is a continuation-in-part of U.S. application Ser. No. 09/521,236, filed Apr. 5, 2000, now U.S. Pat. No. 6,483,612, which is a Continuation of U.S. application Ser. No. 09/060,906, filed Apr. 15, 1998, now abandoned. The entire disclosure of the prior applications are hereby incorporated by reference.

BACKGROUND OF THE INVENTION

1. Field of the Invention

The present invention relates to projection systems and projection screens and more particularly to an improved screen apparatus that includes a double layered screen construction.

2. Background of the Related Art

Projected light may be used to display images on large surfaces, such as large computer displays or television screens. In a front projection system, an image beam is projected from an image source onto the front side of a reflection-type, angle transforming screen, which then reflects the light toward a viewer positioned in front of the screen. In a rear projection system, the image beam is projected onto the rear side of a transmission-type, angle transforming screen and transmitted toward a viewer located in front of the screen.

Referring to FIG. 1, wide angle projection systems that include a screen apparatus 10 are known to optimally use a conventional Fresnel lens 11 in combination with some diffusing element, such as a substrate covered with glass beads (e.g., a type of diffuser or diffusive screen) 12. The combination forms an imaging screen that produces an image. The Fresnel lens 11 and the diffuser assembly 12 are held in relatively rigid or semi-rigid spaced apart relation to assure proper operation of the combination. Such screens, known generally in the art as "black matrix bead" or "BMB" screens, are commercially available from Minnesota Mining & Manufacturing Company and others. Fresnel lenses used in devices such as overhead projectors and projection television are commercially available from, for example, Fresnel Optics, Minnesota Mining & Manufacturing Company, and others. The Fresnel lens 11 element is constructed to provide the optical properties of a much thicker lens, however, with smaller thickness and weight. Concentric steps or discontinuities 11A allow these optical and physical properties to be realized. Each of the steps has a curved profile, in cross-section, that exhibits optical power to redirect incident light 13. The cut-out sections that define the steps reduce the overall size and weight.

In FIG. 1, the Fresnel lens 11 receives the incoming light 13 from a projection image engine or image projector 14 (e.g., a liquid crystal display imager, a light source, and a projection lens that produce image light in response to input video or other signals). The break in the light path of the light 13 shown in FIG. 1 is included to recognize that the light 13 may be processed or filtered, for example, projected by the projection or other lens (not shown), and is generally indicated by numeral 13A. The screen apparatus 10 and the image engine 14 are arranged such that a light beam exiting the Fresnel lens 11 is collimated, as shown by parallel rays of light 15. The collimated rays 15 pass across an air gap 16 to a matrix of glass beads 17–21 in the diffuser assembly 12. The glass beads 17–21 are mounted upon an adhesive black mask layer 22 that is on a first surface 23 of a substrate 24 of the diffuser assembly 12. As the collimated light rays 15 strike any of the glass beads 17–21, the rays 15 are refracted and focused to a point as shown in FIG. 1. The substrate 24 is light transparent so that a viewer 27 can see an image from the light 25 that passes through a surface 26 (e.g., an acrylic, polystyrene, other polymer, or like surface) of the screen apparatus 10. The exiting rays are now wide angle transformed for wide angle viewing. The screen apparatus 10 can be an "touch screen" television screen, having a large diagonal dimension, for example, substantially 60 inches, or a computer monitor screen.

Problems have been associated with BMB-type screens that affect their manufacturing quality control. Uniformity of bead diameter has been problematic with the BMB screens of the type having beads placed directly upon a substrate. In these screens the beads are, for example, attached to the substrate by an adhesive. Some adhesives used in BMB screens define a black matrix that can have holes. These holes may allow light to pass through at improper locations. Another problem with bead placement upon a matrix is associated with packing density. Often it is difficult to insure that the beads are densely packed enough to avoid light transmission non-uniformity or image non-uniformity. The beads themselves may also suffer from diameter variations, transparency differences, and surface glare, and may include relatively large inactive portions and therefore non-useful parts.

The present invention is directed to avoid or substantially avoid some or all of the problems set forth above, as well as other problems.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

In general, in one aspect, embodiments of the invention feature a screen apparatus that includes a first layer for substantially collimating light, a second continuous layer positioned proximate the first layer for receiving the substantially collimated light from the first layer and for converging the received substantially collimated light, and a third layer adjacent the second layer, having a plurality of openings for receiving and altering the converging light as image light. The second layer includes an array of bead-like members.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

Other objects and advantages of the invention will become apparent upon reading the following detailed description and upon reference to the drawings in which:

FIG. 1 is a side, cross-sectional view of a prior art BMB projection screen that uses a Fresnel lens in combination with a spaced apart bead covered diffuser;

FIG. 2 is a side, cross-sectional view of a screen apparatus in accordance with an embodiment of the invention;

FIG. 3 is a partial perspective view of a portion of the embodiment in FIG. 2;

FIG. 5 is a side, cross-sectional view of a screen apparatus in accordance with an embodiment of the invention; and FIGS. 6 and 7 are side, cross-sectional views of display apparatuses in accordance with embodiments of the invention.

Figure 4A:
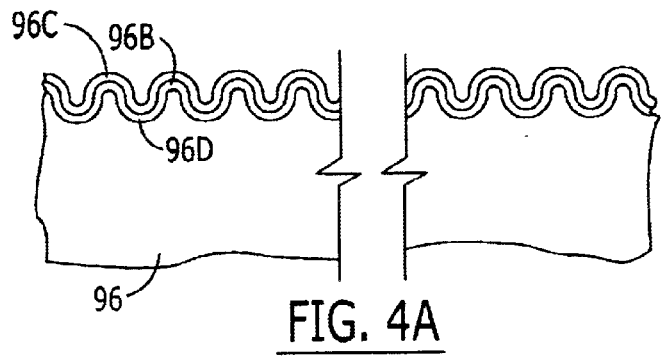
FIG. 4A is a cross-sectional view of a master tool for use in constructing a screen apparatus in accordance with an embodiment of the invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF PREFERRED EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that even if such a development effort were complex and time-consuming, it would nevertheless be a routine undertaking for those of ordinary skill in the art having the benefit of this disclosure.

The present invention provides an improved projection screen apparatus, such as for use in a rear projection television or computer monitor that eliminates or substantially reduces the problems and shortcomings of the prior art BMB-type projection screens. The present invention provides a screen apparatus that includes a micro-replicated bead-like surface on a layer of material that receives incoming light from a lens layer, such as a Fresnel lens.

In FIG. 2, a screen apparatus 30 is shown in accordance with an embodiment of the invention. The screen apparatus 30 includes planar members, a first layer 31 and a second layer of material 75, which can be parallel to each other, and are spaced apart by an air gap 74. The first layer 31 forms a collimating optical element (i.e., a collimator) or lens layer. The first layer of material 31 can be in the form of a lens, such as a Fresnel lens. The layer 31 provides opposed surfaces 33, 34. Incoming light radiation 32 from the image engine 14, which may be diverging (or converging in other embodiments), strikes the first surface 33 of the first layer 31 and exits the second surface 34 as substantially or completely collimated beam radiation. The collimated light 35 includes rays that are substantially parallel so that the beam does not converge or diverge appreciably. The image light 32 is similar to the image light 13 in FIG. 1, with a break labeled 32A in the light path being analogous to the break 13A in FIG. 1. For example, the light 32 may be processed or projected by a projection or other lens (not shown) to the first layer 31, as generally indicated by the numeral 32A.

The second layer 75 (e.g., a diffuser 72) is a focusing (e.g., converging) layer. The first surface 76 includes projecting members 78–81, which are like lenslets. In the example of FIG. 2, the projecting members 78–81 are convex-shaped bead-like projecting members; however other shapes and configurations may also be appropriate. Each of the projecting members 78-81 has a spherical sector or a like-rounded projecting portion 82 and a periphery 83, as shown in FIGS. 2 and 3. Each projecting member 78–81 can be hexagonal in shape at its periphery 83, as shown in FIG. 3, although other shapes besides hexagonal could be used for the periphery 83 as will be appreciated by those skilled in the art having the benefit of the present disclosure. Moreover, each projecting member 78–81 terminates at the periphery 83, where one projecting member joins the next. The periphery 83 defines the projecting members 78–81 as being only partially spherical or partially rounded surfaces of other shapes. For example, the projecting members 78–81 may form hemispheres. The spherical sector 82 is substantially equivalent to the active portion of the balls 17–21 in FIG. 1 (i.e., each of the spherical sectors 82 exhibits optical power). Only a portion of the balls 17–21 is active and the remainder is inactive, so the spherical sector 82 is analogous to just the active portion.

The projecting members 78–81 are not separate beads adhered to a substrate with black adhesive, as with the prior art BMB screens. Instead, the projecting members 78–81 are integrally formed with a substrate 84, beginning at the first surface 76 and terminating at the second surface 77 thereof. The substrate 84 is also integral or continuous with the projecting members 78–81. A mask 86 can form a third or mask layer or coating (e.g., a thin coating) on the second surface 77 of the diffuser 72, adjacent the substrate, as shown in FIG. 2. The mask 86 includes openings 87–91. The openings 87–91 allow the image light 35, focused as light 92, to pass through the mask 86 at the focal point of each projecting member 78-81. The light rays are shown in FIG. 2 passing through opening 87, although the light 92 could have been drawn to pass through any one of the other openings 88–91 if the incident light 32 passed through any one of the projecting members 79–81 corresponding to the openings 88–90. The light 92 can then be viewed by the viewer 27 after it is diffused by the diffuser 72. The openings 87–91 can be laser ablated openings.

The projecting members 78–81 are very small, preferably spaced between about 5 and 100 microns apart, this spacing being designated by numeral 93 in FIG. 2. In general, the openings 87–91 have the same spacing as the projecting members 78–81. The spacing of the openings 87–91 as well as the thickness of the mask 86, designated by numeral 94 in FIG. 2, can be of appropriate or sufficient sizes, depending on the specific application, as determined by, but not limited to, the visual quality and contrast of images observed on the screen apparatus 30 by the viewer, how close or far the viewer needs to be from the screen apparatus 30 to resolve small image features, and the like. The ratio of the thickness of the mask 86 to the size of the openings 87–91 should be appropriate and sufficient to allow passage of image light through the openings 87–91 while absorbing or substantially absorbing light not desired for imaging in the regions of the mask 86 between the openings 87–91, as will be appreciated by those skilled in the art having the benefit of the present disclosure.

In accordance with an embodiment of the invention, a method of constructing the screen apparatus 30 shown in FIG. 2 includes forming a matrix of the projecting members 78–81 on the first surface 76 of the substrate 84 and integral with the substrate 84. Formation of the projecting members 78–81 will be discussed further below. The mask 86 is formed opposite the matrix of the projecting members 78–81, preferably on the second surface 77 of the substrate 84. The mask 86 may be a black layer of material that does not allow light to pass through because of absorption. For example, carbon or another black or light absorbing material impregnated in glue or cement could be used for the mask 86, deposited on the second surface 77 of the substrate 84 by co-extrusion, lamination, deposition, or other layering processes. The mask could also be a photosensitive material, and the like, such as photoresist impregnated with carbon or other black or light absorbing material. The mask 86 could be a photographic film that can be selectively exposed to light to form blackened light absorbing regions and light transmitting regions.

The openings 87–91 are then formed through the mask 86 at selected positions, so that the light 92 can substantially only pass through the diffuser 72 at the openings 87–91. The first and second layers 31, 75 are positioned (e.g., rigidly or semirigidly) generally parallel to one another to receive the incoming image light 32. The portions of the mask 86 exclusive of the openings 87–91 will substantially prevent the transmission of light through the diffuser 72 in all but the selected locations that correspond to the openings 87–91.

The openings 87–91 of the mask 86 are preferably formed with a laser, for example, by laser ablation using an excimer laser. This may be accomplished by directing the laser radiation along approximately the exact same path, relative to the screen apparatus 30, that the output image light from engine 14 will pass during viewing by the viewer 27, as will be appreciated by those skilled in the art having the benefit of the present disclosure. The laser radiation is directed through the first layer of material 31 and each projecting member 78–81 (e.g., the member 78) focuses the laser light at a focal point 55 on the mask 86. Laser ablation then forms each opening (e.g., the opening 87) in the mask 86 at the focal point 95 of the projecting member 78. In effect, the laser simply takes the place of the projection engine 14 in FIG. 2 until all the desired openings are burned or ablated through the mask 86. Thus, the openings are effectively self-aligned because of the laser output being positioned where the image engine 14 will be later located for imaging through the screen apparatus 30.

One process for forming the projecting members 78–81 at the first surface 76 of the substrate 84 is micro-replication. Micro-replication can be performed after a master is constructed. The master is constructed by making a surface relief tool that looks similar to a complement of the screen apparatus embodiment shown in FIG. 3. The tool can be manufactured by a technique such as computer aided design (CAD) or an optical raytracing program and then the design could be precision milled and/or ground according to the program to render the tool in a material (e.g., a metal material) that forms a press or planar mold. Alternatively, a plastic material such as thermal plastic could be used to form the surface relief tool, which would be hardened to retain its shape. The material could be a photo-polymer that is polymerizable with ultraviolet light. An aluminum layer (or the like) could then be deposited on its surface and then nickel (or the like) electroplated on the aluminum to form the master.

Figure 4B:
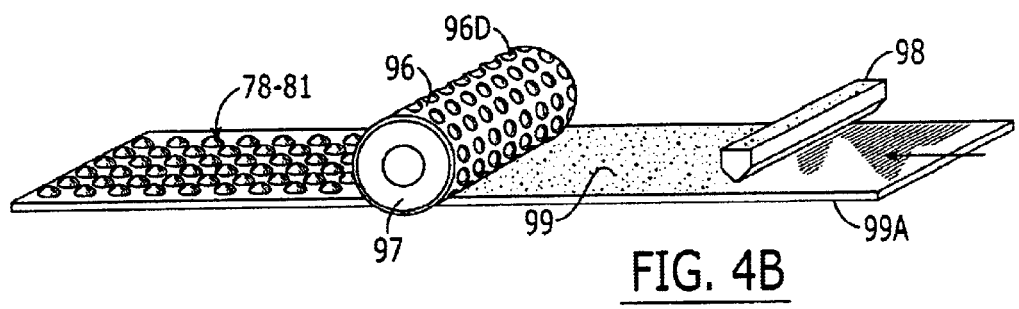
FIG. 4B is a perspective view of an apparatus that uses a master tool in a process for constructing a screen apparatus in accordance with an embodiment of the invention.

The master tool constructed with thermal plastic or photo-polymer, or the like, is generally shown in cross-section in FIG. 4A to include a substrate portion 96, an aluminum layer 96B, and a nickel layer 96C. Either of the tools described above could be made to wrap around a cylinder or roller. Whether a roller device or a press or planar mold device is used, the device would emboss or mold the projecting surfaces on a transparent heated or heatable thermal plastic material or other material used for the substrate 84. The roller would be turned or the mold pressed while embossing or molding the projecting members 78–81 into the thermal plastic material fed to the roller or presented to the press mold. FIG. 4B shows a roller 97 configured with the tool 96 wrapped around it, a feeder or hopper 98 for feeding the thermal plastic material 99, which is dropped onto a conveyer belt 99A. The material 99 could be heated in the hopper 98 and/or heated with an appropriate heating means on the belt 99A, as will be appreciated by those skilled in the art having the benefit of the present disclosure. Complements 96D of the projecting members 78–81 could emboss the material 99 to form the projecting members 78–81 as the rollar 97 turns, as generally shown in FIG. 4B. The thermal plastic that forms the projecting member 78–81 could then be hardened, for example, by photo-polymerization. The projecting members 78–81 would be integral or continuous with the substrate 84.

For a press or planar mold, the master would not be wrapped around a roller. Instead, the planar mold would be heated and used to emboss or mold the projecting members 78–81 in the thermal plastic used for the substrate 84. This compression mold would be brought to bear on the heated thermal plastic of the substrate 84. With either a roller or a planar mold method, the thickness of the embossed projecting members 78–81 and the substrate 84 would be determined by the gap or nip between the master and whatever surface is opposed to the roller or planar mold (e.g., the conveyer belt 99A) with the material for the substrate 84 fed therebetween. In other embodiments, an extrusion process could be used to form the projecting members 78–81 on the substrate 84. All of these processes would allow for the projecting members 78–81 to be asymmetrical, if so desired, rather than symmetrical like the embodiment shown in FIG. 3.

Figure 4C:
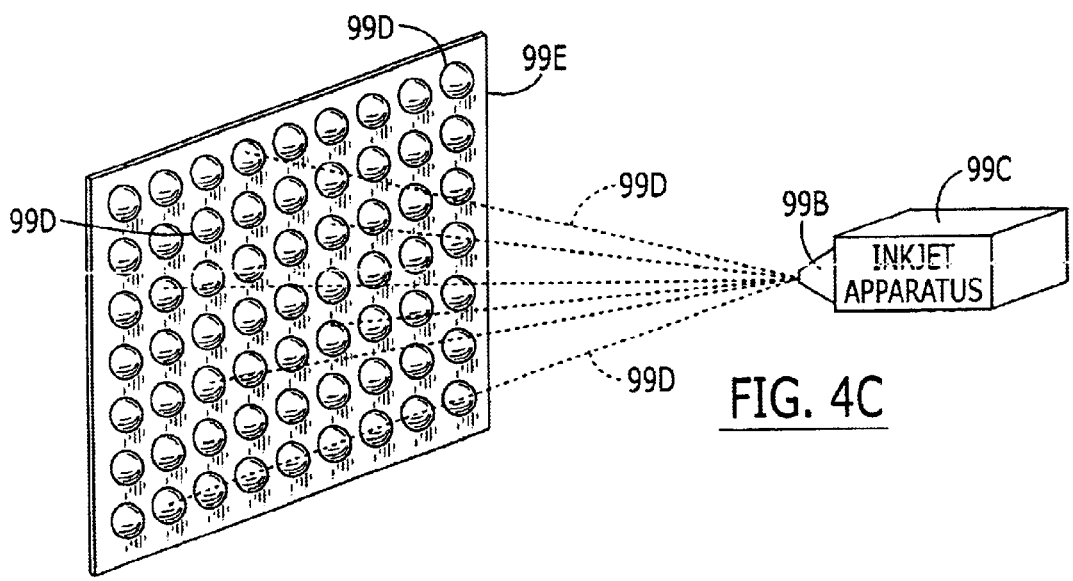
FIG. 4C is a perspective view of an apparatus used in making a master tool for use in constructing a screen apparatus in accordance with an embodiment of the invention.

Another method for constructing a master, generally shown in FIG. 4C, uses an inkjet nozzle 99B of an inkjet apparatus 99C to form microdroplets of a hot liquid 99D (such as a solder, polymer, photoresist material, and the like) that land on a target substrate 99E. Depending on the type of material ejected through the inkjet nozzle 99B, the droplets 99D would be controllably formed with different meniscus profiles as the droplets 99D are scanned across the target substrate 99E. Spherical, approximately spherical, or other shaped surfaces could be produced as the material lands on the target substrate 99E, which could be a metal, plastic, such as thermal plastic, and the like. The droplets 99D that land form complements of the lenslets 78–81 shapes and are used for micro-replicating (i.e., the droplets 99D that land form a "negative"). Aluminum can be deposited on the droplets 99D that have landed (e.g., if the drops 99D are plastic or photoresist materials), followed by nickel electroplating to form a harder material layer, as described above. The resulting mold can be wrapped around a cylinder or a roller or can be used to form a planar mold that would be used to make a second "positive" master. The negative master would be used to construct the positive master in plastic, or thermal plastic, which would also be coated with aluminum and nickel as described above. The second master would be rolled or pressed against transparent photo-polymer or thermal plastic material fed to the roller or planar mold to emboss or mold the projecting members 78–81. The projecting members 78–81 would then be hardened, for example, by UV photo-polymerization, as similarly described above.

Another method for constructing a master uses a photopolymer base or other substrate on which photosensitive material (e.g., photoresist) is deposited. A laser source is used to produce an interference pattern (i.e., the laser can write the interference pattern in the photosensitive material) using known techniques. The intensity profile of the interference pattern is controlled to correspond to or approximately correspond to the desired profile for forming the projecting members 78–81. The profiles could be designed to be cylindrical instead of spherical in some embodiments. For example, the interference pattern could be written in the photoresist to produce two dimensional (i.e., crossed) periodic cylindrical profiles with different periods between the peaks of adjacent profiles in the two orthogonal directions. A certain level of control of the profile could be maintained to produce the correct final cylindrical profiles in the photoresist, for example, through the use of spatial filters, laser light masking, or other filtering techniques. Positive or negative photosensitive material could be used, depending on the specific configuration, as will be appreciated by those skilled in the art having the benefit of the present disclosure. After exposure and development of the photosensitive material, whether a spherical or cylindrical profile is desired, aluminum could be deposited to coat the remaining photosensitive material and regions where the photosensitive material has been removed. This could be followed by nickel electro-plating to form the master. In yet other methods for producing a master, a self-registering photomask would be used to produce a pattern for exposure of the photosensitive material or a laser would be used with a lens or other spatial filter to expose the photosensitive material in a desired exposure profile in a scanning registration pattern (similar to the inkjet approach above) instead of by interference of a-laser beam.

It will be apparent to those skilled in the art that the masters described above could be constructed to form the projecting members 78–81 with techniques that use one or more positive or negative (i.e., complement) copying or rendering steps, or combinations thereof. Such positive or negative or combination steps are included within the scope of the invention.

Regardless of the technique of producing the master, as discussed, in certain embodiments, cylindrical lenslets could be produced in the two orthogonal directions of a two dimensional plane upon embossing or molding of material for the projecting members 78–81 with the master. These lenslets could be designed to exhibit two different magnifications in the orthogonal directions of a screen constructed with them as viewed by a viewer. The light would be controlled asymmetrically with this screen such that the viewing angle in the vertical direction is much smaller than the viewing angle in the horizontal direction in front of the screen. Therefore, light that cannot be easily seen by the viewer would not be wasted in the vertical direction and could instead be used more efficiently at least in the horizontal direction or in other ways. For example, the portions of the angular spread of light from the screen going towards the ceiling and floor, which are not easily seen by the viewer, would be more angularly limited than the portions of the angular spread of the light in the horizontal plane in front of the screen, which are more easily observed by the viewer.

Referring now to FIG. 5, a screen apparatus 100 is shown in accordance with another embodiment of the invention. The screen apparatus 100 includes spaced apart components, a holographic optical element (HOE) 102 and a diffuser 72' similar to the second layer 75 or the diffuser 72 (all primed elements in FIG. 5 are similar to or analogous to their unprimed counterparts in FIG. 3 and are constructed in similarity to the descriptions given above, including the descriptions of the processes for constructing the projecting members). The HOE 102 forms the collimating optical element (i.e., a collimator). The HOE 102 may be formed by processes described in the aforementioned U.S. patent application Ser. No. 09/060,906, including recording in an appropriate optical setup using reference and object beams.

The incoming light radiation 32 from the image engine 14, which may be diverging (or converging in other embodiments), strikes a first surface 103 of the HOE 102 and exits the second surface 104 of the HOE 102 as the substantially collimated beam radiation 35' (similar to the light 35). The substantially collimated beam 35' includes rays that are substantially parallel so that the beam does not converge or diverge appreciably. The HOE 102 and the diffuser 72' (e.g., a focusing layer thereof are spaced apart by an air gap 74'. Minimizing the size of the air gap 74' may help reduce the effects of chromatic dispersion, as will be appreciated by those skilled in the art having the benefit of the present disclosure.

Figure 7:
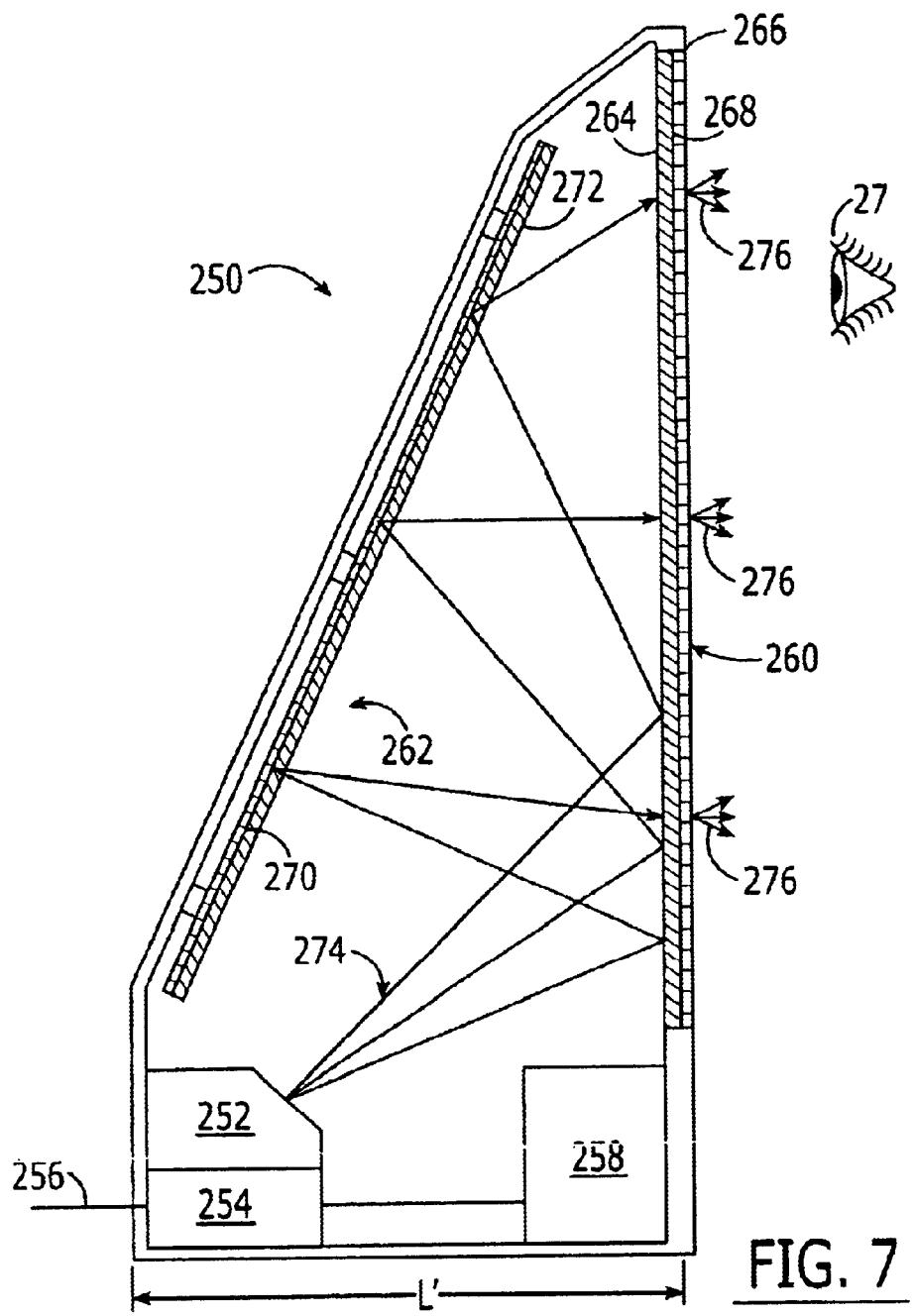

The screen apparatuses 30 and 100 described above may be advantageously employed in "folded" display apparatuses 200 and 250 shown in FIGS. 6 and 7, respectively, in accordance with embodiments of the invention. The display apparatuses 200 and 250 may form part of a computer monitor or television display and are similar to projection systems described in prior, co-owned U.S. patent application Ser. No. 08/581,108, filed Dec. 29, 1995, by Richard M. Knox, entitled "Projecting Images" and in European Pat. app. No. 96309443.8, EP0783133A1, filed Dec. 23, 1996, by Richard M. Knox et al., entitled "Projecting Images," published Jul. 9, 1997, which are incorporated by reference herein in their entirety. The folded optical paths in the display apparatuses 200 and 250 enables the size of these image projection apparatuses to be reduced compared to other types of display apparatuses. For example, the "footprint" dimensions "L" and "L'" may be made smaller by folding, which reduces the apparent projection lengths in these apparatuses.

Referring to FIG. 6, the display apparatus 200 includes an image engine or projector 202, which may be similar to the image engine 14 described above. The image engine 202 may also be similar to image engines described in U.S. patent application Ser. No. 08/730,818, filed Oct. 17, 1996, by Richard M. Knox, entitled "Image Projection System Engine Assembly," now U.S. Pat. No. 6,390,626, which is incorporated by reference herein in its entirety. The image engine outputs image light 204 in response to input signals, for example, electronic, video, or other signals received from an antenna, cable, computer, or controller. The image light 204 reflects off a lower mirror or reflector 206 to a higher mirror or reflector 208. The light 204 is then reflected by the upper minor or reflector 208 and is directed to an optical element 210. The optical element 210 may be similar to the first layer 31 (e.g., a Fresnel lens) or the HOE 102, depending on the design of the display apparatus 200. The air gap 74, 74' is not shown in FIG. 6. The image light exiting the optical element 210 could, therefore, be collimated, converging, or diverging, according to the particular design, as it enters a diffusive screen or diffuser 212, held spaced apart from the optical element 210. The diffuser 212 may be similar to the diffuser 72 or the diffusers described in the aforementioned U.S. patent application Ser.

No. 09/060,906. The diffuser 212 scatters the image light as light 214, which the viewer 27 can see as forming an image at the diffuser 212 of the display apparatus 200.

Referring to FIG. 7, the display apparatus 250 is shown, which includes an image engine or projector 252, a signal splitter 254, an input cable 256, a sound system 258, a screen apparatus 260, and a back mirror or reflector 262. The image engine 252 may be similar to image engines described above and in the aforementioned U.S. patent application Ser. No. 08/730,818, now U.S. Pat. No. 6,390,626. The screen apparatus 260 includes a polarizing reflector 264, an optical element 266, and a diffusive screen or diffuser 268. The optical element 266 and the diffuser 268 are held together in spaced apart relation (not shown in FIG. 7). The polarizing reflector 264 may be held in spaced apart relation from the optical element 266 or not in spaced apart relation (i.e., substantially with no air gaps, although not shown in FIG. 7). An example of a material that may be used for the polarizing reflector 264 is double brightness enhancement film (DBEF), also called multilayered optical film MOF), commercially available from Minnesota Mining & Manufacturing Company, or other wide-angle polarizing reflector materials. The polarizing reflector 264 has a characteristic of preferentially reflecting light of a first linear polarization and preferentially transmitting light of a second linear polarization, orthogonal to the first polarization light. Depending on the design of the display apparatus 250, the optical element 266 may be similar to the first layer 31 or the HOE 102 described above. Likewise, depending on the design, the diffuser 268 may be any one of the diffusers described in the aforementioned U.S. patent application Ser. No. 09/060,906 or it may be the diffuser 72.

The back reflector 262 includes a mirror or reflector 270 and an achromatic retarder 272 that, depending on the design, may be layered, coated, bonded (e.g., with index matching adhesive), adjacent or otherwise applied together in the order shown in FIG. 7. The back mirror or reflector 270 and the achromatic retarder 272 may be held together in spaced apart relation or not in spaced apart relation (i.e., substantially with no air gaps). Suitable achromatic retarders may be designed to accommodate a spaced apart arrangement, as will be appreciated by those skilled in the art having the benefit of the present disclosure.

In operating the display apparatus 250, the image engine 252 receives an electronic signal through the input cable 256 and provides the signal to the signal splitter 254. The signal splitter 254 divides the signal into, for example, a video signal and an audio signal, and provides these signals to the image engine 252 and the sound system 258, respectively. The image engine 252 converts the video signal into projected image light 274. The electronic signal received by the cable 256 may be any type of signal containing video information, such as a television signal received by an antenna or over cable lines, or a computer video signal received through a computer video cable. The audio signal and the sound system are optional.

The image light 274 may be polarized in the image engine 252 in a light source thereof (not shown) or by a polarizer (not shown) that may be employed external to the image engine 252 to polarize the image light in the first polarization discussed above. In a first instance, the image light 274 output from the image engine 252 and polarized in the first polarization direction is reflected by the polarizing reflector 264 toward the back reflector 262. The reflected image light 274 passes through the achromatic retarder 272 a first time, is reflected by the back mirror or reflector 270, and passes through the achromatic retarder 272 a second time directed again toward the screen apparatus 260. The achromatic retarder 272 is designed to have an optical thickness (substantially one-quarter wave), such that the double pass of the image light 274 in the first polarization will undergo an effective half-wave polarization shift or rotation of substantially 90 degrees. Thus, the image light 274 now directed toward the screen apparatus will substantially be in the second polarization and will substantially pass through the polarizing reflector 264 to the optical element 266. The optical element 266 collimates, converges, or diverges this light, according to the design (similar or analogous converging and diverging operations are described in the aforementioned U.S. patent application, Ser. No. 09/060,906), which is subsequently scattered by the diffuser 268 as image light 276. The viewer 27 can then observe an image produced by the image light 276 at the diffuser 268 of the screen apparatus 260, in similarity to the descriptions given above.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A screen apparatus, comprising:
   a first layer adapted to substantially collimate light;
   a second continuous layer positioned proximate the first layer adapted to receive the substantially collimated light from the first layer and to converge the received substantially collimated light, the second continuous layer comprising an array of projecting members that are spaced between about 5 and 100 microns apart, continuous with the second layer; and
   a third layer adjacent the second layer and remote from the array of projecting members that are spaced between about 5 and 100 microns apart, having openings adapted to receive and to pass the converging light as image light, the first layer, the second continuous layer and the third layer being sufficiently large to provide a screen apparatus for a computer monitor or a television.

2. The screen apparatus of claim 1, wherein the projecting members comprise an array of surfaces adapted to accept and focus the substantially collimated light.

3. The screen apparatus of claim 1, wherein the third layer comprises a mask portion adapted to substantially block light transmission except at the plurality of openings.

4. The screen apparatus of claim 1, wherein the projecting members comprise hemispheres.

5. The screen apparatus of claim 1, wherein each of the projecting members is adapted to substantially focus light at a corresponding focal point.

6. The screen apparatus of claim 5, wherein each focal point is proximate one of the plurality of openings.

7. The screen apparatus of claim 1, wherein the first layer comprises a Fresnel lens.

8. The screen apparatus of claim 1, wherein the first layer comprises discontinuous steps.

9. The screen apparatus of claim 1, wherein the projecting members comprise an array of spherical sectors.

10. The screen apparatus of claim 1, wherein the first and second layers are spaced apart by an air gap.

11. The screen apparatus of claim 1, wherein the third layer comprises a black adhesive material.

12. The screen apparatus of claim 1, wherein the third layer is adapted to absorb light that is not used as the image light.

13. The screen apparatus of claim 1, wherein the first layer comprises a holographic optical element.

14. A computer monitor comprising the screen apparatus of claim 1.

15. A television comprising the screen apparatus of claim 1.

16. A folded optical system comprising the screen apparatus of claim 1.

17. The image projection system of claim 1, wherein regions between the openings are adapted to exclude light that is not the image light.

18. A method of manufacturing a projection screen, comprising:
    imaging a master that comprises photosensitive material;
    providing a first layer for collimating light;
    providing a second layer;
    forming a matrix of projecting members that are spaced between about 5 and 100 microns apart in a first surface of, and continuous with, the second layer by replicating the master;
    providing a mask layer on a second surface of the second layer that is remote from the first surface; and
    forming openings in the mask layer at selected positions thereof.

19. The method of claim 18, further comprising positioning the first layer parallel to the second layer.

20. The method of claim 18, wherein the openings are formed with a laser.

21. The method of claim 18 wherein the openings are formed with an excimer laser.

22. The method of claim 18, wherein each of the projecting members has a corresponding focal point.

23. The method of claim 18, wherein laser light is directed through the first layer, the second layer and the mask so that the projecting members focus the laser light to form the openings.

24. The method of claim 18, wherein the placing comprises positioning the first layer generally parallel to the second layer.

25. The method of claim 18, wherein the placing comprises positioning the first layer spaced apart from second layer.

26. The method of claim 18, wherein the openings are formed through the mask layer at selected positions such that light can pass through the openings.

27. The method of claim 18, further comprising forming the mask layer on the second layer.

28. The method of claim 18, wherein the openings are formed about the focal points of the projecting members.

29. The method of claim 18, wherein the first layer, the second layer, the projecting members, and the mask layer are comprised in a folded optical system.

30. The method of claim 18, wherein providing the first layer comprises providing a holographic optical element.

31. The method of claim 30, further comprising providing an air gap between the holographic optical element and the second layer.

32. The method of claim 30, further comprising substantially minimizing a gap between the holographic optical element and the second layer for reducing effects of chromatic dispersion.

33. The method of claim 18, further comprising forming the projecting members to control magnification of image light differently in vertical and horizontal directions.

34. A screen apparatus, comprising:
    a sheet of at least partially transmissive material having a first surface and a second surface, the sheet being sufficiently large to provide a screen apparatus for a computer monitor or a television, wherein the first surface comprises a non-planar surface forming a predetermined distribution of localized positive optical power units, the second surface has a layer of at least partially absorbing material formed thereon, and the predetermined distribution of localized positive optical power units are spaced between about 5 and 100 microns apart.

35. The screen apparatus according to claim 34, wherein a viewing angle of the screen apparatus is smaller in a vertical direction than in a horizontal direction.

36. The screen apparatus according to claim 34, wherein the predetermined distribution of localized positive optical power units are configured to exhibit at least two different magnifications.

37. The screen apparatus according to claim 34, wherein the predetermined distribution of localized positive optical power units are configured to provide sufficient power to ablate the partially absorbing layer when a source of laser energy is passed therethrough.

38. The screen apparatus according to claim 34, wherein the predetermined distribution of localized positive optical power units are configured so that, when light is passed therethrough, the light is focused sufficiently to expose the partially absorbing layer for photolithography.

39. The screen apparatus according to claim 34, wherein the localized positive optical power units comprise a plurality of projecting members.

40. The screen apparatus according to claim 39, wherein the plurality of projecting members are substantially uniform in size and shape.

41. The screen apparatus according to claim 39, wherein the plurality of projecting members are hemispheres.

42. The screen apparatus according to claim 39, wherein the plurality of projecting members are cylindrical sectors.

43. The screen apparatus according to claim 34, wherein the plurality of projecting members each have substantially the same transmissivity.

44. The screen apparatus according to claim 34, further comprising an optical element optically coupled to the sheet and configured to receive light from an image engine.

45. The screen apparatus according to claim 44, wherein the optical element substantially collimates the light received from the image engine.

46. The screen apparatus according to claim 44, wherein the optical element comprises a holographic optical element.

47. The screen apparatus according to claim 45, wherein a distance between the sheet and the holographic optical eminent is minimized to reduce chromatic dispersion.

48. The screen apparatus according to claim 44, wherein the optical element comprises a Fresnel lens.

49. The screen apparatus according to claim 44, wherein the sheet focuses the light received from the optical element.

50. A folded optical system comprising the screen apparatus of claim 44.

51. The screen apparatus according to claim 50, further comprising:
    a projection apparatus for producing an image on a display surface optically coupled to the sheet, the projection apparatus including:

an image engine;

an optical device; and an optical system capable of transmitting light from the image engine to the display surface such that the light travels an image path which reaches the optical device twice on its way to the display surface, for reflecting light from the display surface at one instance, and for passing through the display surface at another instance, wherein the optical device is reflective of some light and transmissive of other light.

52. The screen apparatus according to claim 34, wherein the layer formed of at least partially absorbing material comprises a plurality of openings, wherein each opening is substantially aligned with a respective one of the localized positive optical power units.

53. The screen apparatus according to claim 52, wherein a ratio of a thickness of the layer formed of at least partially absorbing material to a size of the plurality of openings is configured to allow passage of image light through the openings while absorbing other light in regions of the at least partially absorbing layer between the openings.

54. The screen apparatus according to claim 34, wherein the layer formed of at least partially absorbing material comprises one of carbon or another black or light absorbing material impregnated in glue or cement.

55. The screen apparatus according to claim 34, wherein the layer formed of at least partially absorbing material comprises a black adhesive material.

56. The screen apparatus according to claim wherein the layer formed of at least partially absorbing material is deposited on the second surface using one of co-extrusion, lamination, deposition, or another layering process.

57. The screen apparatus according to claim 34, wherein the layer formed of at least partially absorbing material comprises a photosensitive material.

58. A computer monitor comprising the screen apparatus of claim 34.

59. A television comprising the screen apparatus of claim 34.

60. The screen apparatus according to claim 34, wherein the sheet is rigid.

61. The screen apparatus according to claim 34, wherein the sheet is non-rigid.

62. The screen apparatus according to claim 34, wherein the second surface comprises an approximately planar surface.

63. A method of forming a screen apparatus, comprising:

forming a master by imaging a photosensitive material;

forming a predetermined distribution of localized positive optical power units that are spaced between about 5 and 100 microns apart in a first surface of a sheet of at least partially transmissive material that is sufficiently large to provide a screen apparatus for a computer monitor or a television, by replicating the master;

forming a layer of at least partially absorbing material on a second surface of the sheet that is opposite the first surface; and forming openings in the at least partially absorbing layer by irradiating the at least partially absorbing layer with light through the first surface of the sheet, wherein the localized positive optical power units focus the light so that the openings are created in the at least partially absorbing layer that are substantially aligned with the localized positive optical power units.

64. The screen apparatus according to claim 63, wherein a ratio of a thickness of the at least partially absorbing layer to a size of the opening is configured to allow passage of image light through the openings while absorbing other light in regions of the at least partially absorbing layer between the openings.

65. The screen apparatus according to claim 63, wherein the at least partially absorbing layer comprises one of carbon or another black or an at least partially absorbing material impregnated in glue or cement, and wherein the step of forming openings in the at least partially absorbing layer by irradiating the at least partially absorbing layer with a light comprises abating the openings with coherent light.

66. The screen apparatus according to claim 63, wherein the step of forming the at least partially absorbing layer on the second surface of the sheet comprises depositing the at least partially absorbing layer on the second surface of the substrate using one of co-extrusion, lamination, deposition, or another layering process.

67. The screen apparatus according to claim 63, wherein the at least partially absorbing layer comprises a photosensitive material; and the step of forming openings in the at least partially absorbing layer by irradiating the at least partially absorbing layer with light through the first surface of the substrate comprises forming lightened areas in the photosensitive material through which light can pass.

* * * * *

UNITED STATES PATENT AND TRADEMARK OFFICE
CERTIFICATE OF CORRECTION

PATENT NO.    : 6,788,460 B2
DATED         : September 7, 2004
INVENTOR(S)   : Knox et al.

It is certified that error appears in the above-identified patent and that said Letters Patent is hereby corrected as shown below:

Column 12,
Line 54, should read -- 47. The screen apparatus according to claim 46, wherein --

Column 13,
Line 30, should read -- 56. The screen apparatus according to claim 34, wherein the --

Signed and Sealed this

Thirty-first Day of May, 2005

JON W. DUDAS
*Director of the United States Patent and Trademark Office*